(12) United States Patent
Pipho et al.

(10) Patent No.: US 8,601,190 B2
(45) Date of Patent: Dec. 3, 2013

(54) PROVIDING MULTIPLE COMMUNICATION PROTOCOLS FOR A CONTROL SYSTEM HAVING A MASTER CONTROLLER AND A SLAVE CONTROLLER

(75) Inventors: Randall Pipho, Leander, TX (US);
Ryan Edwards, Round Rock, TX (US);
Mehdi Abolhassani, Austin, TX (US);
Enrique Ledezma, Austin, TX (US);
Alex Skorcz, Cedar Park, TX (US);
Thomas Keister, Georgetown, TX (US)

(73) Assignee: TECO-Westinghouse Motor Company, Round Rock, TX (US)

( * ) Notice: Subject to any disclaimer, the term of this patent is extended or adjusted under 35 U.S.C. 154(b) by 158 days.

(21) Appl. No.: 13/167,922

(22) Filed: Jun. 24, 2011

(65) Prior Publication Data

US 2012/0331195 A1    Dec. 27, 2012

(51) Int. Cl.
*G06F 13/00* (2006.01)
*G06F 13/364* (2006.01)

(52) U.S. Cl.
CPC .................................. *G06F 13/364* (2013.01)
USPC .......................................................... 710/110

(58) Field of Classification Search
USPC ............... 710/104–110, 300–311, 58–62
See application file for complete search history.

(56) References Cited

U.S. PATENT DOCUMENTS

| | | | |
|---|---|---|---|
| 3,581,212 A | 5/1971 | McMurray | |
| 3,867,643 A | 2/1975 | Baker et al. | |
| 4,052,657 A | 10/1977 | Kleiner et al. | |
| 4,542,380 A | 9/1985 | Beckner et al. | |
| 4,674,024 A | 6/1987 | Paice et al. | |
| 5,278,848 A * | 1/1994 | Yamaguchi | 714/800 |
| 5,452,419 A * | 9/1995 | Di Giulio et al. | 709/200 |
| 5,619,407 A | 4/1997 | Hammond | |
| 5,625,545 A | 4/1997 | Hammond | |
| 5,638,263 A | 6/1997 | Opal et al. | |
| 5,734,565 A | 3/1998 | Mueller et al. | |
| 5,986,909 A | 11/1999 | Hammond et al. | |
| 6,005,788 A | 12/1999 | Lipo et al. | |
| 6,014,323 A | 1/2000 | Aiello et al. | |
| 6,021,308 A * | 2/2000 | Kimura | 725/75 |
| 6,031,738 A | 2/2000 | Lipo et al. | |
| 6,150,731 A | 11/2000 | Rinaldi et al. | |
| 6,166,513 A | 12/2000 | Hammond | |
| RE37,126 E | 4/2001 | Peng et al. | |
| 6,229,722 B1 | 5/2001 | Ichikawa et al. | |
| 6,236,580 B1 | 5/2001 | Aiello et al. | |

(Continued)

OTHER PUBLICATIONS

Dr. Keith Corzine, "Operation and Design of Multilevel Inverters," Developed for the Office of Naval Research, Dec. 2003, Revised Jun. 2005, pp. 1-79.

*Primary Examiner* — Raymond Phan
(74) *Attorney, Agent, or Firm* — Trop, Pruner & Hu, P.C.

(57) ABSTRACT

A control system may be provided for a controlled system such as a drive or inverter system. To provide for control in such system, a master controller may be present to receive, via a second communication protocol from a cabinet controller coupled to the master controller, status information of a controlled device, generate control information based at least in part on the status information, and transmit the control information to the cabinet controller via the second communication protocol. In turn, the cabinet controller can generate and communicate a control packet to the controlled device via a first communication protocol. This packet can be interleaved within another message communicated from the cabinet controller to the device.

21 Claims, 8 Drawing Sheets

(56) References Cited

U.S. PATENT DOCUMENTS

| | | | |
|---|---|---|---|
| 6,262,555 B1 | 7/2001 | Hammond et al. | |
| 6,301,130 B1 | 10/2001 | Aiello et al. | |
| 6,320,767 B1 | 11/2001 | Shimoura et al. | |
| 6,340,851 B1 | 1/2002 | Rinaldi et al. | |
| 6,377,478 B1 | 4/2002 | Morishita | |
| 6,467,065 B1 * | 10/2002 | Mendez et al. | 714/800 |
| 6,621,719 B2 | 9/2003 | Steimer et al. | |
| 6,653,744 B2 | 11/2003 | Stricker | |
| 6,697,271 B2 | 2/2004 | Corzine | |
| 6,762,947 B2 | 7/2004 | Hammond | |
| 6,898,095 B2 | 5/2005 | Bijlenga et al. | |
| 7,106,793 B2 * | 9/2006 | Spichale | 375/238 |
| 7,164,201 B2 | 1/2007 | Manz et al. | |
| 7,190,070 B2 | 3/2007 | Manz et al. | |
| 7,231,467 B2 * | 6/2007 | Baker et al. | 710/9 |
| 7,242,584 B2 | 7/2007 | Kroneder | |
| 7,508,147 B2 | 3/2009 | Rastogi et al. | |
| 7,603,501 B2 * | 10/2009 | Hsieh et al. | 710/110 |
| 7,733,947 B2 * | 6/2010 | Sumitomo | 375/219 |
| 7,830,681 B2 | 11/2010 | Abolhassani et al. | |
| 7,849,243 B2 | 12/2010 | Wagh | |
| 7,940,537 B2 | 5/2011 | Abolhassani et al. | |
| 2003/0223251 A1 | 12/2003 | Hammond | |
| 2007/0016708 A1 * | 1/2007 | Park | 710/110 |
| 2007/0064366 A1 | 3/2007 | Hammond | |
| 2008/0079314 A1 | 4/2008 | Hammond | |
| 2008/0080213 A1 | 4/2008 | Zhang | |
| 2008/0081244 A1 | 4/2008 | Hammond | |
| 2008/0088186 A1 | 4/2008 | Hammond | |
| 2008/0270656 A1 * | 10/2008 | Bracamontes Del Toro | 710/110 |
| 2009/0013100 A1 * | 1/2009 | Lee | 710/30 |
| 2009/0021922 A1 | 1/2009 | Popp et al. | |
| 2010/0073970 A1 | 3/2010 | Abolhassani et al. | |
| 2010/0328848 A1 | 12/2010 | Ledezma et al. | |
| 2010/0328883 A1 | 12/2010 | Ledezma et al. | |
| 2011/0013428 A1 | 1/2011 | Abolhassani et al. | |
| 2011/0125940 A1 * | 5/2011 | Aue et al. | 710/105 |
| 2012/0117284 A1 * | 5/2012 | Southcombe et al. | 710/105 |

* cited by examiner

PROVIDING MULTIPLE COMMUNICATION PROTOCOLS FOR A CONTROL SYSTEM HAVING A MASTER CONTROLLER AND A SLAVE CONTROLLER

BACKGROUND

Different communication protocols can exist in various control systems. For example, many industrial control systems communicate control information from a controller to a controlled device. These communications can be sent over various physical components such as fiber optic cables or electrical cables such as Ethernet, cable or other serial or parallel links.

In addition, the actual communications can be according to a given communication scheme. Many control systems have a customized communication scheme that is tuned for the particular type of information that is communicated. However, some control systems can require sending of very different types of information with different sizes, latencies and so forth such that a single communication protocol cannot be tuned to the multiple communication requirements.

In a different field, computer systems can have various buses and other communication interfaces to enable the various devices such as memories, disk drives, processors, peripheral devices and so forth to communicate with each other. Typically, computer systems use standard communication interfaces such as a PCI bus protocol to enable peripheral devices to communicate, and a SATA communication protocol to enable disk drives or other mass storage to communicate with devices. Yet multiple communication schemes do not typically extend to control systems. Examples of control system buses include a Controller Area Network (CAN), Profibus, Modbus, and Industrial Ethernet.

SUMMARY OF THE INVENTION

According to one aspect, the present invention is directed to a control system that includes a master controller and at least one slave controller. The master controller may be configured to receive, via a second communication protocol from a slave controller, status information of a controlled device, generate control information based on the status information, and transmit the control information to the slave controller via the second communication protocol. In turn, the slave controller may be configured to transmit the status information to the master controller and receive the control information from the master controller. The slave controller is further configured to communicate with the device via a first communication protocol. The two protocols may be tuned for different types of communications, such that the first communication protocol may be appropriate for small, low latency communications. In addition, at least the first communication protocol can provide for interleaving of particular types of messages within a larger message of another type. As one particular example, the message to be inserted within another message may be a pulse width modulation (PWM) command to control switching of a bridge circuit of the device.

Yet another aspect of the present invention is directed to a system such as a drive or inverter system that includes one or more modular transformers each having a primary winding coupled to an input power source and secondary windings each coupled to a power cube. In addition, multiple phase output lines each may have at least first and second power cubes. To provide for control in such system, a master controller may be present to receive, via a second communication protocol from a cabinet controller coupled to the master controller, status information of the power cubes, generate control information based at least in part on the status information, and transmit the control information to the cabinet controller via the second communication protocol. In turn, the cabinet controller can generate and communicate a pulse width modulation (PWM) packet to one of the power cubes via a first communication protocol. This packet can be interleaved within another message communicated from the cabinet controller to the power cube. In one embodiment, the PWM packet can be a single segment while the other message can be of a multi-segment format. The PWM packet can be used by the power cube to control switching of a bridge circuit. In turn, the power cube can echo the PWM packet back to the cabinet controller to confirm its receipt and accuracy.

DETAILED DESCRIPTION

In various embodiments, multiple communication protocols may be provided in a control system to enable efficient communication of various types of information. In general, a first communication protocol can provide for communication of short, time-sensitive control messages within a local control environment. A second communication protocol can be used to provide for communication of greater amounts of information used for status as well as lower priority control information. Furthermore, the second communication protocol also may be used for communications between different entities of a control system, in addition to certain communications within a local control environment.

While embodiments are suitable for many different types of industrial control systems and so forth, one particular embodiment disclosed herein is with regard to communications within an inverter or drive system such as a low voltage, medium voltage or high voltage drive system that is configured between, e.g., a utility connection and a powered system such as various industrial motors or so forth. More particularly, the embodiments described herein may be with regard to a modular drive system in which a master controller is present, along with one or more cabinets that include a local controller and multiple inverter cells or cubes. These individual cubes may include appropriate inverter circuitry, including rectification devices, switching devices, DC bus devices and so forth (possibly including regeneration circuitry) to receive an incoming multi-phase AC signal, process the signal, and provide a processed AC output signal of a given phase. In different implementations, these multiple cubes of a given cabinet can be configured symmetrically or asymmetrically to provide processed power of multiple phases. In addition, multiple such cabinets can be provided, depending on a desired application. Examples of such systems can be seen in U.S. Pat. No. 7,830,681, which is hereby incorporated by reference in its entirety. But the scope of the present invention is not limited in this regard, and embodiments may be used in other control systems.

With regard to the communication protocols, in general communications between the master controller and local controllers of one or more individual cabinets may be according to the second communication protocol, while control information from a local controller within a cabinet to one or more individual cubes within the cabinet may be by the first communication protocol (and optionally, another communication channel between the local controller and the cubes via the second communication protocol may also be possible). Feedback information including monitoring information of operating parameters such as current, voltage, temperature, alarms, faults and so forth can be sent according to the second communication protocol.

Figure 1:
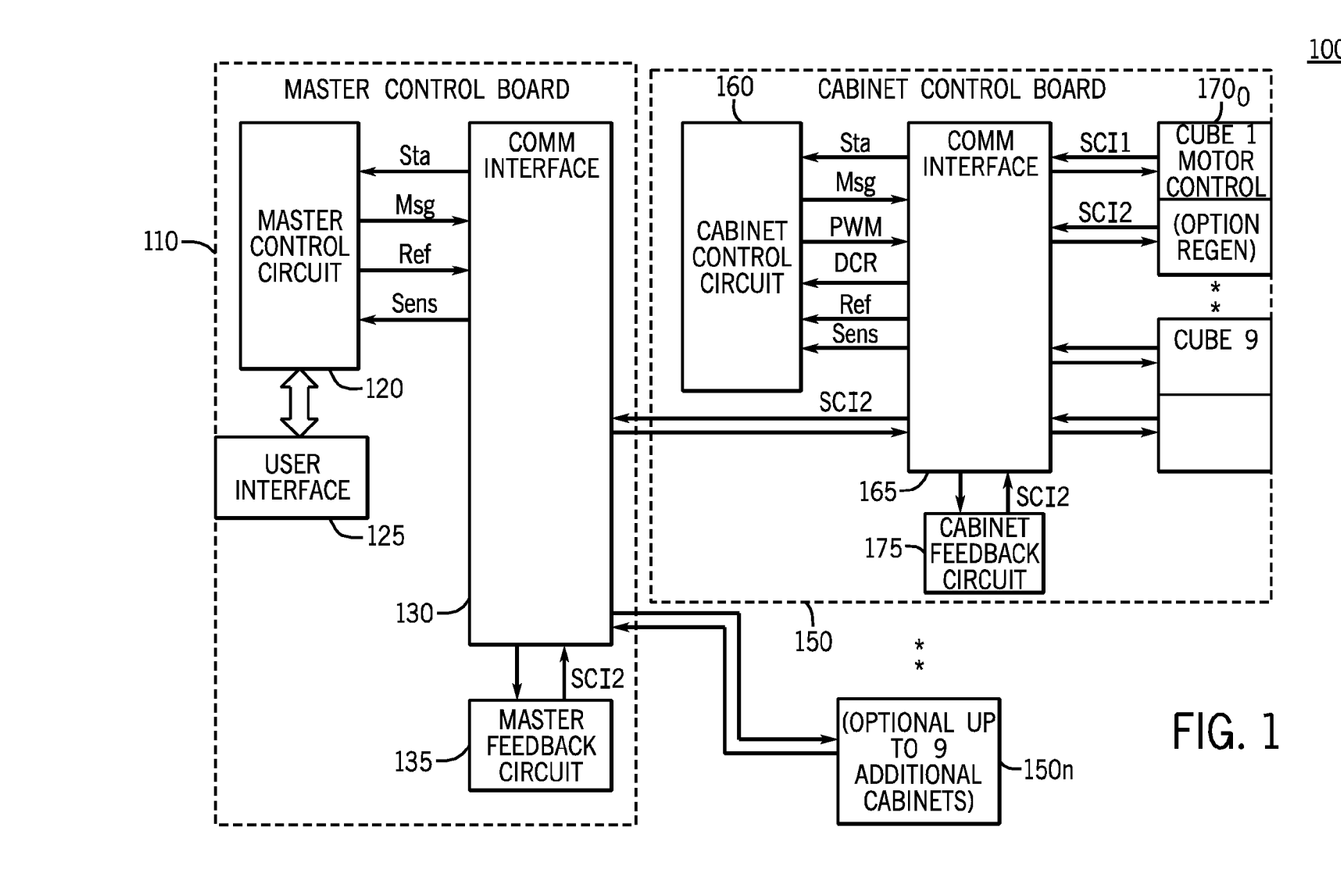
FIG. 1 is a high level block diagram of a control system in accordance with one embodiment of the present invention.

Referring now to FIG. 1, shown is a high level block diagram of a control system 100 including a master controller, implemented in the embodiment of FIG. 1 as a master control board 110, and one or more local controllers, implemented in the FIG. 1 embodiment as slave or cabinet control boards $150_0$-$150_n$. Note that while described herein as "boards" understand that the scope of the present invention is not limited in this regard and controllers or control mechanisms can be implemented via many different techniques, which may include providing control mechanisms such as microcontrollers or other programmable logic without separate circuit boards throughout the system as shown in FIG. 1.

The architecture of the control system of FIG. 1 is thus based on a centralized master control board (MSCB) (and also referred to as a master controller) 110 and one or more cabinet or inverter control boards (ISCBs) 150. In one embodiment, the MSCB is responsible for sensorless vector motor control voltage, user interface, input and output voltage and current sensing, and reference control voltage generation. In turn, the ISCB is responsible for pulse width modulation (PWM) generation, multi-level power switching and optional regeneration by individual separate inverter cubes, local ISCB environmental monitoring, and local ISCB control.

As seen in FIG. 1, master control board 110 may include a master control circuit 120 which can be used to perform various processing based on received information, including user information received via a user interface 125, e.g., according to a Modbus over Ethernet TCP/IP protocol, and status information received from a master feedback circuit (also referred to as master high voltage feedback circuit (MHVF)) 135. As further seen, communications between master control board 110 and various cabinet control boards 150 can be via a communication interface 130 which may include various circuitry, including a communication field programmable gate array (FPGA). In turn communication interface 130 performs serial communication control between master controller 110 and the ISCB's, and performs serial communication control between master feedback circuit 135 and master control circuit 120. In general, communications between master control circuit 120 and communication interface 130 may include different types of information, including receipt of status information, e.g., from various cabinets, as well as sensing information, which again can be received from the various cabinets and from master feedback circuit 135. Such communications between master controller 110 and communication interface 130 may be via communication paths such as parallel data busses with framing bits to indicate packet boundaries and using a 4-edge handshake control signals to control the flow of data between the different clock domains of the two devices. The status links may contain all traffic from all the ISCBs in the system back to the MSCB. A temperature status link can be used for each ISCB to occasionally update the temperature status of each cube and report it back to the MSCB, and a DC rail average link can be used for each ISCB to occasionally update the average DC rail voltage of the ISCB to the MSCB. The sensor link provides MHVF related data, read responses, and status to master control circuit 120.

Outgoing communications from master control circuit 120 may include various messages, which can be status or control information to be provided to the various cabinet control boards 150. In addition, reference information, which can be reference or threshold levels to be used for purposes of detecting conditions within the control system, can be provided, e.g., to master feedback circuit 135 as well as to the individual cabinets. This reference link thus provides reference voltages for motor control and for optional regeneration control that can be sent to each ISCB over this interface.

In the embodiment shown in FIG. 1, communications between communication interface 130 and master feedback circuit 135 as well as communications between communication interface 130 and the cabinet control boards 150 may be via the second communication protocol which can be an optical-based serial communication protocol, referred to herein as SCI2. In an embodiment for a drive system as in FIG. 1, the SCI2 interface is a full duplex serial communication scheme to convey voltage reference, control, and status digital data between the system controller and one or more cabinet controllers. The data rate can be 10 Mbit/s, and communication may be via a plastic optical fiber coupled between the master controller and each of the cabinet controllers.

With regard to the cabinet control board 150, various communications can flow between a cabinet control circuit 160, a communication interface 165, and a plurality of power cubes $170_0$-$170_n$. Incoming communications from master control board 110 may be via the second communication protocol SCI2. To provide control information to be used to control various cubes 170 of the cabinet, cabinet control circuit 160 may generate control signals, namely pulse width modulation (PWM) control signals that can be provided to communication interface 165, which in turn generates PWM messages that can be sent to the cubes via a first communication protocol, namely an optical-based serial communication protocol referred to herein as SCI1. The SCI1 interface is targeted at transferring the PWM signals between a cabinet controller and a given cube. This protocol however is flexible enough to allow additional communication of higher level status and control information. In one embodiment, the SCI1 interface is a full duplex serial communication scheme to convey the PWM signals, control, and status digital data between the cabinet controller and each inverter cube. The data rate can be 10 Mbits/s, and communication may be via a plastic optical fiber media coupled between the communication interface and each of the cubes. The SCI1 communication protocol can thus be used to communicate PWM switching states for each cube H-bridge, high level commands to each cube from cabinet control circuit 160, and cell status from cubes 170 to the cabinet control circuit 160. Although not shown in FIG. 1, in some embodiments additional communications may be sent via a SCI1 interface although in other embodiments, such communications can be sent across a separate SCI2 fiber.

As seen in FIG. 1, the communication path between communication interface 165 and cubes 170 may be bi-directional. Additional communications from cabinet control circuit 160 to communication interface 165 may include messages, which can be messages including status messages, error messages and so forth directed to master controller 110. In the receive direction, various status information can be received by cabinet control circuit 160. Furthermore, various sensed information, including voltages and currents and so forth can be received by cabinet control circuit 160. In addition, reference information, which may correspond to reference signals generated by master control circuit 120, can be received in cabinet control circuit 160 and used to generate different control signals including the PWM signals. As further seen in FIG. 1, cabinet control board 150 may further include a cabinet feedback circuit 175 (also referred to as an inverter high voltage feedback circuit (IHVF), which provides feedback information regarding operation of the cubes to communication interface 165 for passing along, e.g., to cabinet control circuit 160 and back to master control circuit 120. Thus the data interfaces between cabinet control circuit 160 and communication interface 165 can include status links, along which status and read responses from all the cubes in the inverter cabinet can be sent back to the ISCB, and can further contain commands from the MSCB to this ISCB. A message interface allows the master controller 110 to communicate to the cubes, MSCB, and IHVF. A DCR link can be used to communicate the present DC rail voltage of all the cubes, e.g., individually. A reference link, which provides voltages for motor control, can be communicated on this interface. A sensor link provides IHVF related data, read responses, and status to the master controller 110. Although shown with this particular implementation in the embodiment of FIG. 1, understand the scope of the present invention is not limited in this regard.

In one embodiment, master control circuit 120 may be implemented using a reconfigurable input/output controller such as a Compact RIO™ controller available from National Instruments, Austin, Tex. Master control circuit 120 may perform reference voltage generation and user interface functions. Also in this embodiment of FIG. 1, cabinet controllers 150 can be implemented using a Compact RIO™ controller and a communication FPGA. Cabinet control circuit 160 performs the PWM generation from a reference voltage received from MSCB 110. Communication interface 165 encodes the PWM states from the cabinet control circuit 160 into transmittable serial quanta, namely SCI1 messages, performs serial communication control between local control circuit 160 and inverter cubes 170, and performs serial communication control between local control circuit 160 and the MSCB.

In the embodiment of FIG. 1, the location of the SCI2 interfaces in the system include HVF voltage and current sensor data exchange. Packets of data containing the sampled input current and input and output voltages are conveyed to the communication interface 165 and then to master controller 110. Other locations of this protocol provide for MSCB-to-ISCB data transfer. The data sent to the ISCB from the MSCB includes ISCB control. Such control communications may be sent to a particular ISCB or broadcast to all ISCBs. Still further instances of the SCI2 protocol can be for motor control reference voltage packets, which can be broadcast to all ISCBs, and regeneration voltage packets which are broadcast to all cubes in the system.

The data sent to the MSCB from the ISCB can include ISCB status, and average ISCB DC rail voltage, and regeneration data between the ISCB and cube in a system that contains an optional regeneration capability. In this case the system voltage reference can be sent to the regeneration control in the cubes. The SCI2 interface between the controller ISCB and the cube regeneration interface conveys this as well as other control information from the ISCB. Regeneration status from the cube is sent to the ISCB over this interface as well.

In one embodiment, a SCI2 serial data bit stream is composed of characters each of 12 total bits. Each bit is 100 nanoseconds (ns), and thus one character containing one byte of data consumes 1.2 microseconds (μs). The format of a SCI2 character in accordance with one embodiment of the present invention is shown in Table 1.

TABLE 1

| Character bit: | Definition | Transfer order |
|---|---|---|
| Start | Always High to indicate a start of character. | First |
| End of Packet | High to indicate a CRC character. | |
| Data 0 | Data Bit 0 (LSB) | |
| Data 1 | Data Bit 1 | |
| Data 2 | Data Bit 2 | |
| Data 3 | Data Bit 3 | |
| Data 4 | Data Bit 4 | |
| Data 5 | Data Bit 5 | |
| Data 6 | Data Bit 6 | |
| Data 7 | Data Bit 7 (MSB) | |
| Parity | Odd parity calculated over bits Frame through Data 7 | |
| Stop | Always Low to indicate the stop of a character. This bit absorbs any bit timing slip caused by differences in the transmitter vs. the receiver internal transmit or data recovery clock rates. | Last |

A SCI2 packet includes a series of characters that forms a message, response, or status. The format of different supported packets for a given control system can be programmable, such that different packets are available in a given control system. Referring now to Table 2, shown is a sample command packet in accordance with one embodiment of the present invention.

TABLE 2

| Character | Bit Definition | Transfer order |
|---|---|---|
| Header | Start bit = 1<br>End of Packet bit = 0<br>8 bits of 1000_0101 (0x85)<br>Parity bit = 0<br>Stop bit = 0 | First |
| Command | Start bit = 1<br>End of Packet bit = 0<br>8 bits of 0000_0010 (0x02)<br>Parity bit = 1<br>Stop bit = 0 | |
| Over Current least significant (LS) Byte | Start bit = 1<br>End of Packet bit = 0<br>8 bits of data<br>Parity bit = n<br>Stop bit = 0 | |
| Over Current most | Start bit = 1 | |

TABLE 2-continued

| Character | Bit Definition | Transfer order |
|---|---|---|
| significant (MS) Byte | End of Packet bit = 0<br>8 bits of data<br>Parity bit = n<br>Stop bit = 0 | |
| CRC | Start bit = 1<br>End of Packet bit = 1<br>8 bits of CRC data<br>Parity bit = n<br>Stop bit = 0 | Last |

As seen in Table 2, packets can be sent with a cyclic redundancy checksum (CRC), which is a CCITT CRC-8 character calculated over the entire packet. In one embodiment, the CRC polynomial for the CRC is: $x^8+x^2+x+1$.

In the embodiment of FIG. 1, the location of the SCI1 interfaces in the system are for motor control PWM switching state transmission. Cabinet control circuit 160 in the ISCB generates the PWM pulses from the received reference voltage. More specifically, in various embodiments cabinet control circuit 160 generates the general message data (e.g., data bits 0 to 7 in Table 1). In turn, communication interface 165 formats the message into a SCI1 or SCI2 packet with the associated serial overhead bits (e.g., start, end of packet, parity, stop) as shown in Tables 1 and 3, and may further compute and check the CRC. After reception in the corresponding cabinet controller the states of the PWM pulses are encoded and sent over the SCI1 interface to a corresponding cube 170 where they are then decoded to drive the current switching IGBTs. Cube control and status can also be exchanged over this same SCI1 interface.

PWM switching state transmission can be interleaved with control data transmission to minimize PWM jitter. Thus using a SCI1 interface in accordance with an embodiment of the present invention, PWM segments can be interleaved with other packet segments, thus preserving the low latency and real time quality of "raw" PWM transfer and at the same time allowing for larger, longer latency data transfers. However, understand that rather than interleaving a PWM segment within another packet, a single PWM segment can be sent to convey a set of PWM switching control signals. And, a packet including non-PWM data and which is formed of multiple segments can also be communicated independently of PWM data. However, in certain embodiments a packet in accordance with the SCI1 communication protocol may be formed of at least four segments so that a full byte of data can be conveyed.

The SCI1 serial data bitstream is composed of segments each of seven total bits. Each bit is 100 ns, so one segment consumes 700 ns. The format of a SCI1 segment in accordance with an embodiment of the present invention is shown in Table 3. In one embodiment, the SCI1 data may be transmitted with no return to zero (NRZ) asynchronous data. In addition to a start bit, data (2-4 bits), and a parity bit, a stop bit may be provided to provide for bit slip elimination.

TABLE 3

| Segment bit: | Definition | Transfer order |
|---|---|---|
| Start | Always High to indicate a start of segment. | First |
| Data 0 | Data Bit 0 (LSB) | |
| Data 1 | Data Bit 1 | |
| Data 2 | Data Bit 2 | |
| Data 3 | Data Bit 3 | |

TABLE 3-continued

| Segment bit: | Definition | Transfer order |
|---|---|---|
| Parity | Odd parity calculated over bits Frame through Data 7 | |
| Stop | Always Low to indicate the stop of a character. This bit absorbs any bit timing slip caused by differences in the transmitter vs. the receiver internal transmit or data recovery clock rates. | Last |

In an embodiment for inverter control systems, a SCI1 segment having data bits 0 through 3 encode either a PWM control command or 2 bits of packet data, as shown in Table 4.

TABLE 4

| Data bits 3:0 | Definition |
|---|---|
| 0000 | PWM H Bridge configuration = Gates Off |
| 0001 | PWM H Bridge configuration =<br>A Upper: On<br>A Lower: Off<br>B Upper: Off<br>B Lower: On |
| 0010 | PWM H Bridge configuration =<br>A Upper: Off<br>A Lower: On<br>B Upper: On<br>B Lower: Off |
| 0011 | PWM H Bridge configuration =<br>A Upper: On<br>A Lower: Off<br>B Upper: On<br>B Lower: Off |
| 0100 | PWM H Bridge configuration =<br>A Upper: Off<br>A Lower: On<br>B Upper: Off<br>B Lower: On |
| 0101 | Undefined |
| 0110 | Undefined |
| 0111 | Undefined |
| 1000 | Undefined |
| 1001 | Undefined |
| 1010 | Start Of Packet |
| 1011 | End Of Packet |
| 11xx | Packet Data |

Packets of SCI1 formatted data can be used to convey messages, responses, and status. These packets are made up of a number of segments. In one embodiment, it can take four segments to make up one byte of packet data, as each segment encodes only two bits of packet data, as shown in Table 4.

In such embodiment, a 2 byte packet plus its CRC takes fourteen segments. Each segment is 7 bits for a total of 98 bits. The total time to send this packet is 9.8 µs, as each bit is 100 ns. The CRC is the CCITT CRC-8 character calculated over the entire packet. In one embodiment, the CRC polynomial for the CRC is: $x^8+x^2+x+1$.

As can be seen, SCI1 is not tuned to transfer significant amounts of packet data, and instead the main benefit of SCI1 is its ability to interleave PWM switching states along with packet data, with minimal impact on PWM switching timing. A cube that receives an incorrect CRC may ignore the received packet. In turn, the master controller may timeout in obtaining a response when it is requesting a read, thus the master controller may read back any written data such as temperature set point, to verify that it was loaded properly. Status data may be periodically sent in case any previous status was dropped, and the master controller may send multiple shut down commands to account for potential errors.

The headers of the SCI1 and SCI2 packets contain the routing information as to how the various packets are to reach their intended destination. The first byte of each packet contains this header byte. The definition of this header for both SCI1 and SCI2 protocols according to one embodiment is shown in Table 5.

TABLE 5

Packet Header

| Bits 7:5 | Bits 4:0 | Definition | Source and Destination Interfaces |
|---|---|---|---|
| 000 | CCCCC | SCI1 Control and Status CCCCC = Cube 1 through 1E CCCCC = 1F for broadcast Any ISCB to cube motor control related packet. | ISCB.Msg to Cube |
| 001 | CCCCC | SCI2 MSCB to ISCB. CCCCC = ISCB 1 through 1E CCCCC = 1F for broadcast | MSCB.Msg to ISCB.Sta ISCB.Msg to Cube.Regen |
| 010 | CCCCC | Self ID Used to communicate the cube or ISCB ID after a link is established. CCCCC = ISCB or Cube 1 through 1E. | Between the Cube and the ISCB and between the ISCB and the MSCB. |
| 100 | 00000 | Local FPGA only. Does not create any fiber traffic. Used for reading communication error counts. | MSCB.Msg to MSCB FPGA ISCB.Msg to ISCB FPGA |
| 100 | 00001 | SCI1 Cube to ISCB Any Cube motor control generated status or read response. | Cube to ISCB.Sta |
| 100 | 00010 | Cube DC Rail | Cube to ISCB.DCR |
| 100 | 00011 | SCI2 ISCB to MSCB | ISCB.Msg to MSCB.Sta |
| 100 | 00100 | SCI2 Cube Regen to ISCB. | Cube.Regen to ISCB.Sta |
| 100 | 00101 | SCI2 HVF | MSCB.Msg to MHVF ISCB.Msg to IHVF MHVF to MSCB.sens IHVF to ISCB.sens |
| 100 | 00110 | SCI2 Reference | MSCB.Ref to ISCB.Ref |
| 100 | 00111 | SCI2 Regen Reference | MSCB.Ref to Cube.Regen |

To understand the interleaving of PWM information within an ongoing communication of other data, reference can be made to Table 6, which shows an example of how this interleaving can be communicated. Assume, for example, the PWM switches from state (A Upper, B lower) to state (A Upper, B Upper) to state (A Lower, B Upper). Also assume state (A Upper, B Lower) was already active before a packet was sent.

TABLE 6

| Segment Number | Segment Data | Segment Definition | Transfer order |
|---|---|---|---|
| 0 | 1010 | start of packet | First |
| 1 | 1100 | header (Cube = 01) bits 7:6 = 00 | |
| 2 | 1100 | header (Cube = 01) bits 5:4 = 00 | |
| 3 | 0011 | PWM H Bridge configuration = A Upper: On A Lower: Off B Upper: On B Lower: Off | |
| 4 | 1100 | header (Cube = 01) bits 3:2 = 00 | |

TABLE 6-continued

| Segment Number | Segment Data | Segment Definition | Transfer order |
|---|---|---|---|
| 5 | 1101 | header (Cube = 01) bits 1:0 = 01 | |
| 6 | 1100 | cmd (command = 04) bits 7:6 = 00 | |
| 7 | 1100 | cmd (command = 04) bits 5:4 = 00 | |
| 8 | 1101 | cmd (command = 04) bits 3:2 = 01 | |
| 9 | 1100 | cmd (command = 04) bits 1:0 = 00 | |
| 10 | 1011 | end of packet | |
| 11 | 1100 | crc (crc = 09) bits 7:6 = 00 | |
| 12 | 0010 | PWM H Bridge configuration = A Upper: Off A Lower: On B Upper: On B Lower: Off | |
| 13 | 1100 | crc (crc = 09) bits 5:4 = 00 | |
| 14 | 1110 | crc (crc = 09) bits 3:2 = 10 | |
| 15 | 1101 | crc (crc = 09) bits 1:0 = 01 | Last |

In this case, the PWM switching states adds two more segments to the communication (segments 3 and 12). The calculated and communicated CRC remains the same (as if the interleaved PWM switching segments are not present) because the CRC calculation only includes packet-related segments. In various embodiments, the PWM switching segments can be interleaved anywhere between packet segments. However, in some implementations, the PWM interleaving may occur at a predetermined location, e.g., after a header, or before CRC information.

For a PWM communication, the four bits defining the PWM state contents are protected by parity, and the PWM segment is echoed back from a given cube 170 to cabinet control circuit 160 when a state change is sent. In general, communication interface 165 transmits a PWM segment and begins a timeout equal to the period of time it takes to transfer three segments. Cube controller 170 immediately transmits (echoes) a segment (as described above) that was received without error back to communication interface 165. Upon correct reception of the echoed segment, communication interface 165 retires that particular PWM transmission, resets the timeout delay, and then transmits following segment(s).

Figure 2:
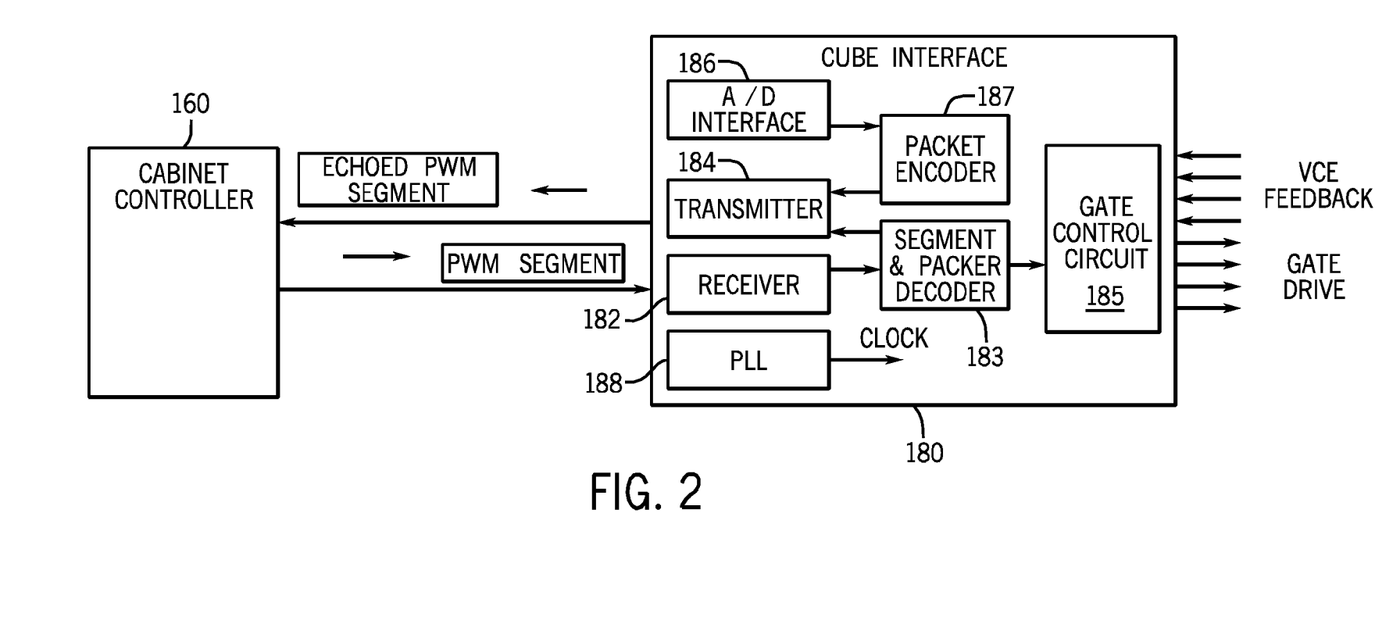
FIG. 2 is a block diagram of a round trip communication of a PWM segment in accordance with an embodiment of the present invention.

Referring now to FIG. 2, shown is a block diagram of a round trip communication of a PWM segment in accordance with an embodiment of the present invention. As shown in FIG. 2, a communication path may provide for PWM segments initiated in a cabinet control circuit 160 to a cube interface 180 which may be present in a given one of cubes 170. Note that for ease of illustration, the intervening communication interface 165 in which the SC1 PWM segments are generated from PWM state provided from cabinet control circuit 160 (and echoed segments are received) is not shown.

As seen in FIG. 2, a PWM segment may be transmitted from cabinet control circuit 160 to cube interface 180. In addition, the echoed segment can be returned back to cabinet control circuit 160. Note although shown at this high level in the embodiment of FIG. 2, in various embodiments the echoed PWM segment can be used and consumed by the communication interface 165, as described above. As further seen, cube interface 180 may include various components, including a receiver 182 and a transmitter 184. Receiver 182 is coupled to provide the received segments to a segment packet decoder 183 which in turn provides control signals to a gate control circuit 185 that provides gate drive signals to the IGBTs of the cube. In turn, gate control circuit 185 further provides voltage feedback signals to a packet encoder 187 which further receives sensing information from an analog-to-digital interface 186 so that encoded status information can be sent via an SCI1 data packet back to cabinet control circuit 160. As further seen cube interface 180 may also include a clock generation circuit 188 which in one embodiment may be implemented via a phase lock loop.

Communication interface 165 (not shown in FIG. 2) analyzes the echoed PWM segment, and re-sends the PWM segment if the wrong echo is detected, or if a round trip timeout is detected, which ensures PWM quality of delivery. Thus another feature of the SCI1 protocol is that PWM segments can be echoed by the cube back to the ISCB to acknowledge successful receipt. When a cube receives a PWM segment with no parity error, it transmits it back to the ISCB. Should the PWM be received incorrectly by the cube, the ISCB will re-transmit the PWM segment because either: there was a timeout since the cube did not echo it; or the echoed PWM segment did not match that transmitted. Should the echoed PWM segment match that transmitted by the ISCB, the PWM state is considered coherent. As such, the ISCB does not send another PWM message to the cube until a state change is to occur. When a new PWM state is generated in the ISCB, the ISCB will transmit another PWM state segment to the cube reflecting this new state.

Figure 3:
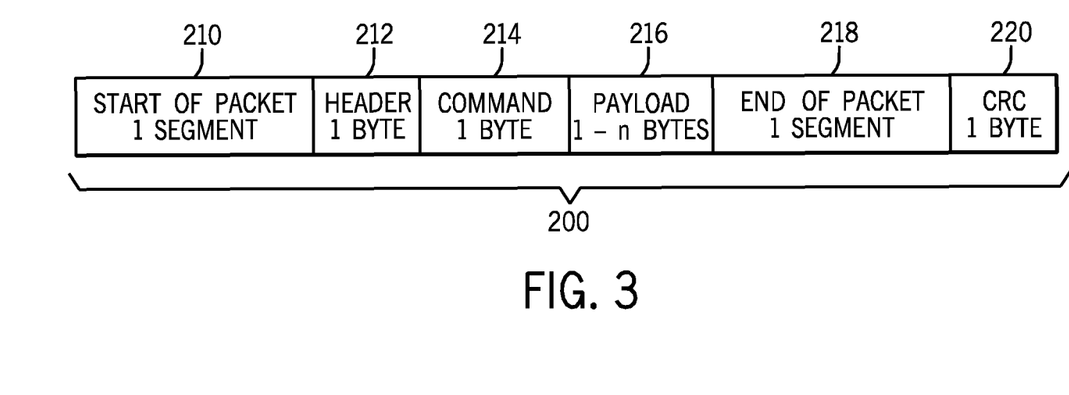
FIG. 3 is an illustration of a packet format for a SCI1 packet in accordance with an embodiment of the present invention.

Referring now to FIG. 3, shown is an illustration of a packet format for a SCI1 packet in accordance with an embodiment of the present invention. As shown in FIG. 3, packet 200 may include a plurality of fields, including a start of packet field 210 which in one embodiment may be a single segment. Next, a header field 212 may be present, which may correspond to a byte of data. Then a command field 214, which may also be a byte of data, is provided. Thereafter a payload field 216 is provided, which may include a number of bytes corresponding to the data payload (e.g., 1-N bytes). After transmission of the payload, an end of packet field 218 (e.g., of a single segment) is transmitted, finally followed by a CRC field 220 which in the embodiment shown may also be a single byte. Although shown with this particular packet format in the embodiment of FIG. 3, understand the scope of the present invention is not limited in this regard, and in other embodiments, additional or different information can be provided and furthermore, the information may be presented in a different order.

Figure 4:
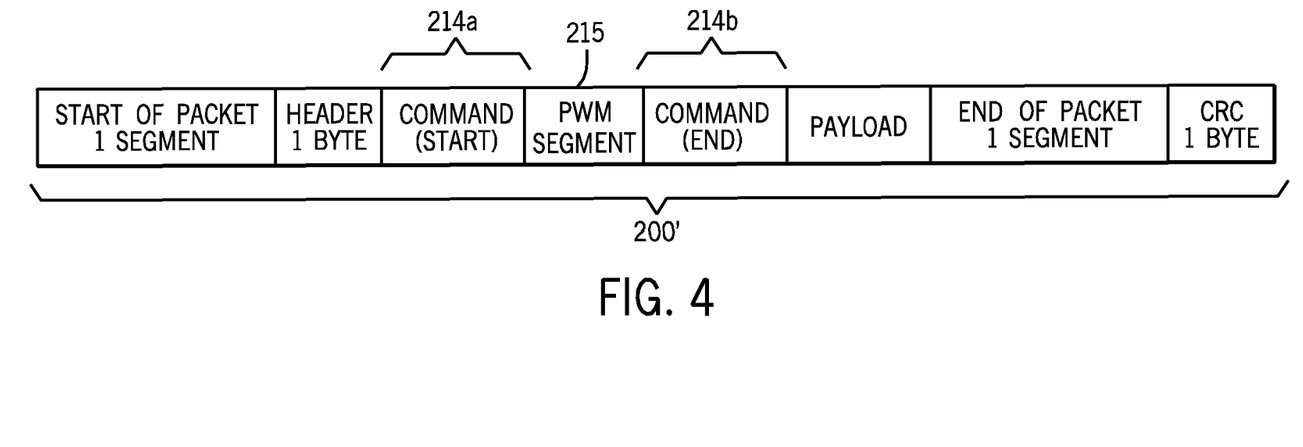
FIG. 4 is an example interleaving of an SCI1 packet communication with PWM data in accordance with one embodiment of the present invention.

Referring now to FIG. 4, shown is an example interleaving of an SCI1 packet communication with PWM data. As shown in FIG. 4, packet 200' may include the same fields described above with regard to FIG. 3. In addition, note the presence of a PWM segment 215, which may be incorporated within the packet structure between a beginning and an end portion of command field (portions 214a and 214b, respectively) 214. Note that while the PWM interleaved segment is located within this particular field in the embodiment of FIG. 4, understand the scope of the present invention is not limited in this manner.

In one embodiment, a header for a SCI1 transmission defines a destination identifier (ID) for the packet. A destination ID of 0 may correspond to the master controller, which is the destination for any status or read response data. A destination ID of 0x1F means a broadcast, which targets all cubes, in one embodiment.

Figure 5:
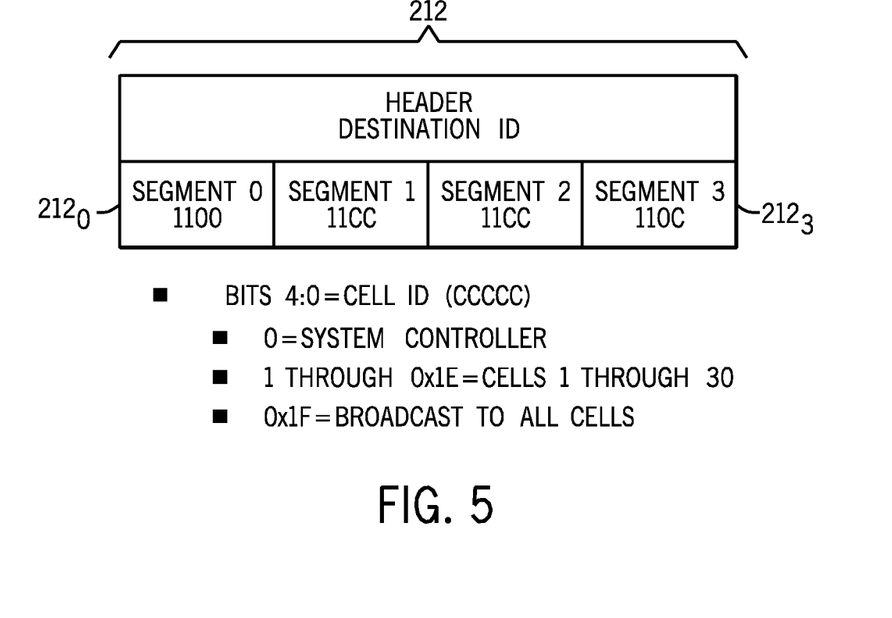
FIG. 5 is an illustration of a header format for an SCI1 packet in accordance with an embodiment of the present invention.

Referring now to FIG. 5, shown is an illustration of a header format for an SCI1 packet in accordance with an embodiment of the present invention. As shown in FIG. 5, a header field 212 may include a destination ID which can be realized via multiple segments $212_0$-$212_3$. Referring now to Table 7, shown is an example encoding of destination IDs in accordance with one embodiment of the present invention.

TABLE 7

Bits 4:0 = Cell ID (CCCCC)
 0 = System Controller
 1 through 0x1E = Cells 1 through 30
 0x1F = Broadcast to all cells A command defines what the packet is, and in one embodiment, the command format for an SCI1 packet can includes the following information shown in Table 8.

TABLE 8

Bits 7:5 = Command (MMM)
 0 = Write
 1 = Read
 2 = Read Response
 3 = Status
 4 through 7 = reserved
Bits 4:0 are Command dependent (xxxxx)

In one embodiment, a write packet can be used to send maintenance or control information from the master controller to a cube. Sample write packets may include setting of various trip points such as temperature trip points, DC rail trip points, 5 volt and 3.3 volt trip points, clearing of error counts or so forth. In turn, a read packet can be used to send maintenance or control information from a cube to the master controller. Example read packet commands may include reading of these various values (e.g., trip points, or present sensed values such as temperature, DC rail voltage, system voltages and so forth). A read response packet sends data from a cube to the master controller in response to a read packet, and a status packet sends status from a cube to the master controller. As one example, such a status packet could be unsolicited data as in a notify situation.

Figure 6:
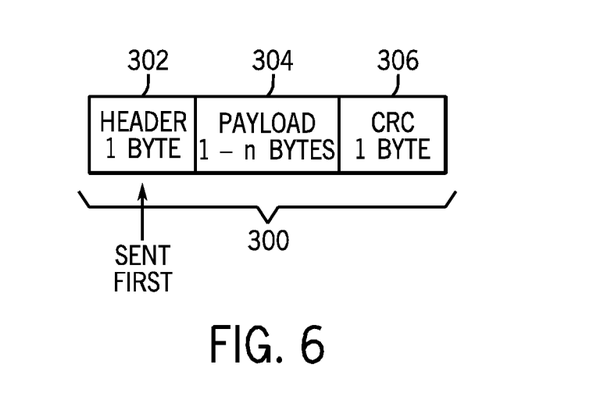
FIG. 6 is an illustration of a packet format for a SCI2 communication in accordance with one embodiment of the present invention.

In one embodiment, a packet format for a SCI2 communication may be as seen in FIG. 6. As seen in FIG. 6, a SCI2 packet format 300 may include a header field 302 (e.g., of a single byte), a payload field 304 which may include a plurality of bytes, and a CRC field 306 which again may be one byte. However, understand that different formats, including different sizes and types of information fields can be present in other embodiments. In one embodiment, the SCI2 header contains the destination cabinet identifier (ID) and the type of packet according to the following Table 9.

TABLE 9

Bits 4:0 = Cabinet ID
 0 = system controller
 1 through 0x1E = Cabinet 1 through 30
 0x1f = Broadcast (All cabinets)
Bits 7:5 = Packet Type
 0 = Normal Packet
 1 = Voltage Reference
 2 = Regen Reference
 3 = ID
 4, 5, 6, 7 = Reserved A voltage reference packet can send a voltage reference to all cabinets simultaneously at the carrier frequency. This packet can be converted by a cabinet control circuit into a PWM pulse. In one embodiment, this packet may include a header, Phase A byte 0 and 1 (sixteen bits of phase A voltage reference); Phase B byte 0 and 1 (sixteen bits of phase B voltage reference); Phase C byte 0 and 1 (sixteen bits of phase C voltage reference); and a CRC.

In one embodiment, a regeneration reference packet is used to send a regeneration reference (V and I) to all cabinets simultaneously, and the packet can be intercepted by the communication interface 165 and sent directly to the cube, and thus does not flow to cabinet control circuit 160. Write packets can be used to send maintenance or control information from the master controller to a cabinet, and the data following a write command can be any data the master control circuit wants to convey from the master controller to the cabinet controller.

Read packets can be used to read maintenance or control information from the cabinet controller to the master controller, and the data following a read command can be any data the master control circuit wants to convey from the master controller to the cabinet controller to further define the read. A read response packet may send data from a cube to the master control circuit responsive to a read packet. In various embodiments, the format of this type of packet may include, in addition to a header and a command for a read response, a cabinet identifier to identify the cabinet number that is sending the packet. Following this cabinet identifier, payload data corresponding to the responsive data may be sent followed by a terminating CRC field.

A status packet sends status from a cabinet to the master controller. This could be unsolicited data as in a notify situation, and where the status packet may have a format similar to a read response packet.

In various embodiments, sensors may be incorporated within the feedback circuits, as well as within the cubes. The various parameters to be sensed such as input and output currents at the system level and output voltage at the system level can be coupled through digitizers such as analog-to-digital converters (ADC), where the digitized information can then be passed through a communication FPGA of the feedback circuit for passing back to the master control circuit 110. In addition, cabinet feedback information, including output current and a thermocouple such as a resistive thermal device (RTD) can also be communicated back in this same manner.

Different latencies can be tolerated for different types of communications. For PWM processing, a total latency can include a system feedback latency, where status information from a cube is provided back to master control circuit 110, a reference calculation latency in the master control circuit, vector transmission, where the vector information is transmitted to a selected cabinet. This information is then provided to a cabinet control circuit 160, where a PWM calculation can be performed that is then transmitted to the indicated cube. Although the scope of the present invention is not limited in this regard in various embodiments, this entire roundtrip latency can be relatively minimal, e.g., on the order of approximately 50-100 µs, although the scope of the present invention is not limited in this regard.

Figure 7:
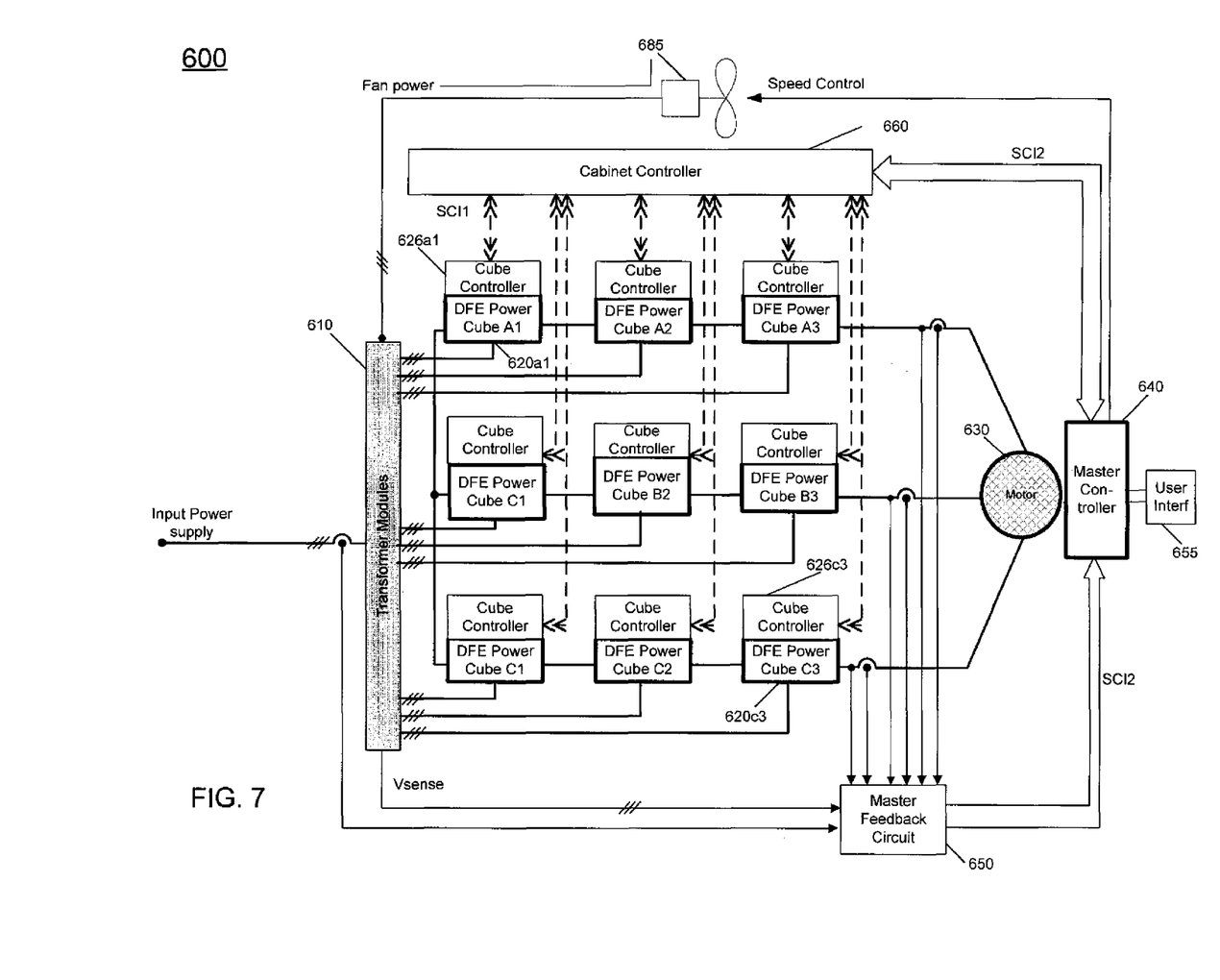
FIG. 7 is a block diagram of a system in accordance with an embodiment of the present invention.

Referring now to FIG. 7, shown is a block diagram of a system in accordance with an embodiment of the present invention. As shown in FIG. 7, system 600 may be a medium-voltage drive having only a single cabinet. Specifically, in the embodiment of FIG. 7, a three-phase, medium-voltage drive is shown that includes a plurality of power cell cubes $620_{A1}$-$620_{c3}$ (referred to in FIG. 7 as diode front end (DFE) cells), although the scope of the present invention is not limited in this regard, and in some embodiments at least some of the front ends may instead be active front ends. As seen, a local cube controller $626_{A1}$-$626_{c3}$ is associated with each of the power cubes.

As seen, each of these local controllers may communicate with a cabinet controller 660 (e.g., correspond to cabinet control board 150 of FIG. 1). In some implementations, a pair of unidirectional fiber optic channels may be coupled between each local controller and cabinet controller 660 to communicate according to the SCI1 protocol. In turn, cabinet controller 660 communicates with a master controller 640, e.g., corresponding to master control board 110.

Master controller 640 may provide control signals to cabinet controller 660 for transmission to the different cube controllers. In one embodiment, these control signals may be voltage reference signals, which cause the cabinet controller to perform certain processing to generate the needed switching signals. In other implementations, the switching signals themselves may be sent by master controller 640 for transmission to the local cell controllers.

As further seen in FIG. 7, a master feedback circuit 650 (e.g., corresponding to master feedback circuit 135 of FIG. 1) may be present to sense or perform signal processing with regard to various information, namely voltage and/or current information obtained both from the input power source and the output of the different phase output lines coupled to a load 630 which in one embodiment may be a motor.

Master controller 640 may further be associated with a user input device 655 such as a keyboard and/or touch screen display and which may be adapted within a user interface bay to enable user input to control various features such as speed, torque, selection of different power cells to be enabled and so forth, as well as to provide status information to the user via a given display or other output means.

As shown in FIG. 7, input power to transformer modules 610 may be provided from an input power supply such as a utility connection.

Figure 8A:
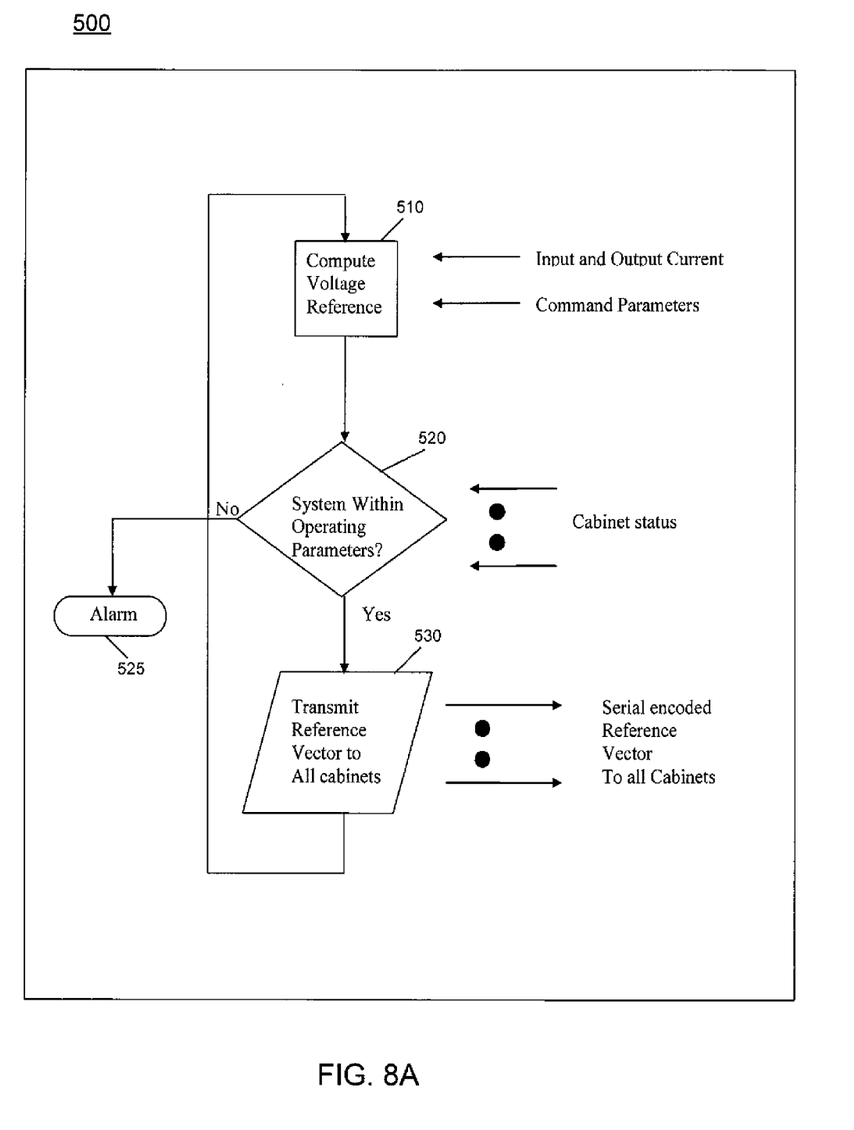
FIG. 8A is a flow diagram for a basic control loop for a master controller in accordance with one embodiment of the present invention.

Referring to FIG. 8A, shown is a flow diagram of a basic control loop for a master controller in accordance with one embodiment of the present invention. As shown in FIG. 8A, method 500 may be performed on a continual basis by the master controller. Specifically, based on input current and output voltage and current information received in the master controller (e.g., from the master feedback circuit and from one or more cabinet controllers, via an SCI2 communication protocol), and various command parameters, including current and voltage ratings, speed, frequency, torque and so forth, a voltage reference may be computed (block 510). In one embodiment, the voltage or current reference may be computed using a standard motor vector control algorithm, e.g., processing torque and flux commands, and rotor position. Next, it may be determined based on various information coming from the different cabinets (also via the SCI2 communication protocol) whether the system is operating within its operating parameters (diamond 520). If not, an alarm may be triggered (block 525) followed by a master control action if required. Otherwise, normal operation may continue and a reference vector may be transmitted to all cabinets (block 530). In one embodiment, this reference vector may be serially encoded and sent to the cabinets, e.g., via a fiber optic interface, in accordance with a SCI2 command packet.

Figure 8B:
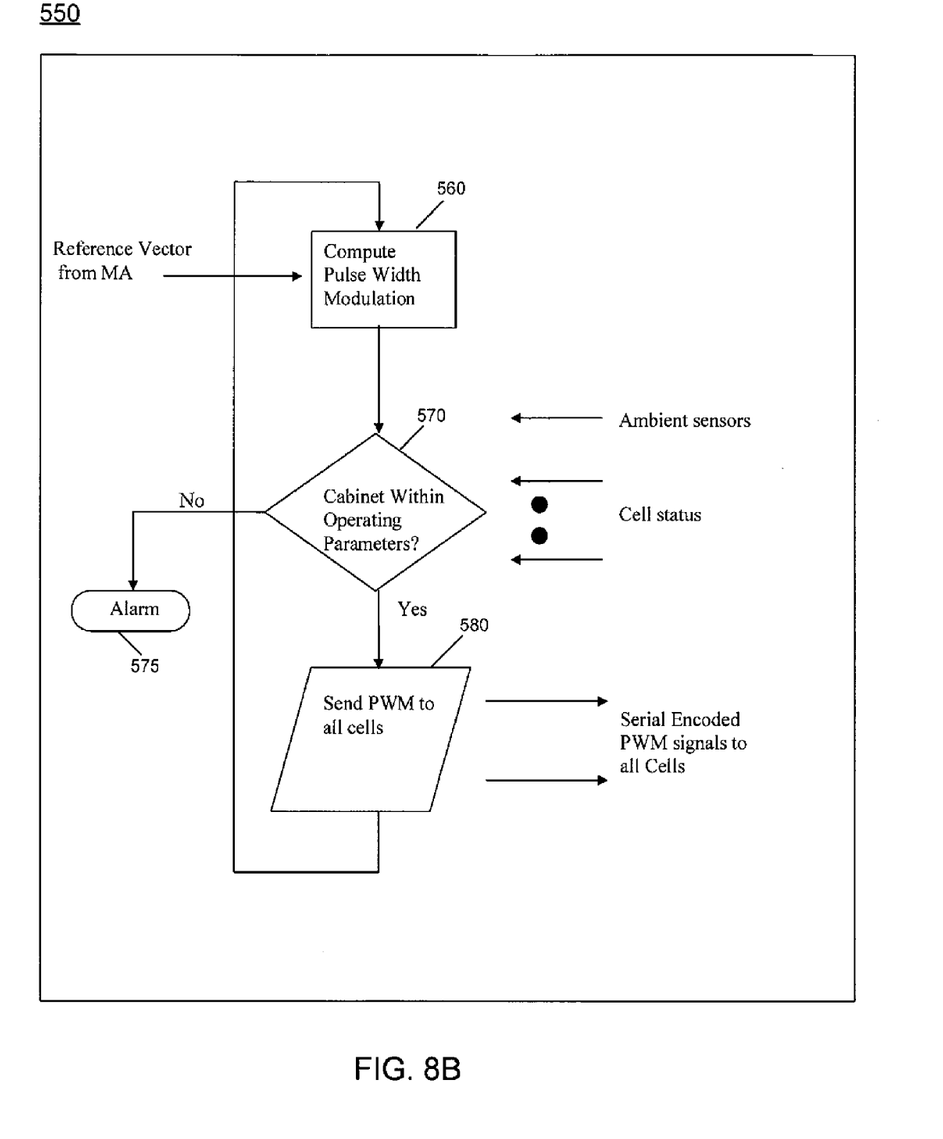
FIG. 8B is a flow diagram for a basic control loop for a cabinet controller in accordance with one embodiment of the present invention.

Referring now to FIG. 8B, shown is a flow diagram for a basic control loop for a cabinet in accordance with one embodiment of the present invention. As seen in FIG. 8B, method 550 may begin by receiving the reference vector from the master controller in a cabinet controller via an SCI2 link. From this reference vector, a switching pattern using a pulse width modulation scheme or any other modulation technique for the cells within the cabinet may be computed (block 560). In one embodiment, this PWM calculation may be in accordance with commands received from the master controller and general drive operation status. Then based on various status information, including information from ambient sensors and the various power cubes, it may be determined whether the cabinet is operating within its operating parameters (diamond 570). If not, an alarm may be triggered (block 575). Otherwise, normal operation may continue and the PWM signals may be sent to the power cubes of the cabinet (block 580). In one embodiment, the PWM signals may be serially encoded and sent to the cubes, e.g., via a fiber optic interface. The PWM signals may be communicated to the individual cube controllers, via the SCI1 communication protocol, either as an independent communication or interleaved within an ongoing packet communication.

Figure 8C:
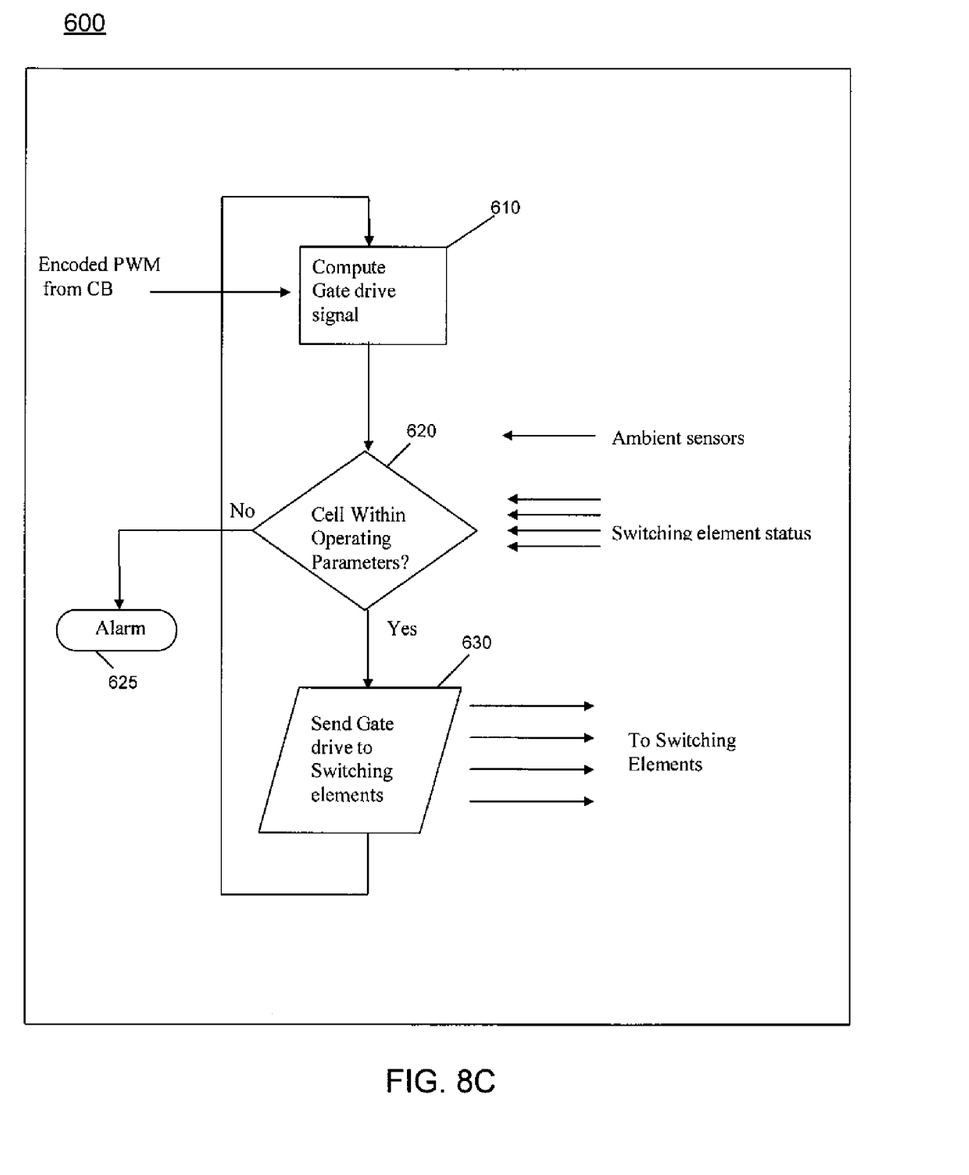
FIG. 8C is a flow diagram for a method for performing control of a power cube in accordance with one embodiment of the present invention.

Referring now to FIG. 8C, shown is a flow diagram of a method for performing control of a power cube via a local controller of the power cube in accordance with one embodiment of the present invention. As shown in FIG. 8C, method 600 may begin by each local controller receiving encoded PWM signals from the cabinet controller of the cabinet. From this information gate drive signals may be computed (block 610). In one embodiment, these signals may be computed by a local FPGA within the power cube, and these computations are based on cube status and PWM command signals received from the cabinet controller. Then, based on various information including ambient sensors and the status of the switching elements themselves, it may be determined whether the cube is operating within its operating parameters (diamond 620). If not, an alarm may be triggered (block 625). Otherwise, normal operation may continue and gate drive signals may be sent to the switching elements (block 630). While shown with this particular control implementation in the embodiment of FIGS. 8A-8C, the scope of the present invention is not limited in this regard. Furthermore, understand that the various control operations described may be performed in different orders and may be performed in different controllers such that the different control can be handled at a more local or global basis depending on a desired implementation.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
    a master controller to receive, via a second communication protocol from at least one slave controller coupled to the master controller, status information of a device controlled by the at least one slave controller, generate control information based at least in part on the status information, and transmit the control information to the at least one slave controller via the second communication protocol; and
    the at least one slave controller to transmit the status information to the master controller and receive the control information from the master controller, wherein the at least one slave controller is further to generate and communicate with the device via a first communication protocol, wherein the first communication protocol provides for communication of command data and status data to the device, and wherein the local controller is configured to interleave a first segment of the first communication protocol including a first command type within a message having a plurality of segments of the first communication protocol.

2. The system of claim 1, wherein the master controller includes:
    a master communication interface having a port to interface with a link coupled to the at least one slave controller;
    a master control circuit to receive the status information and to generate the control information; and
    a master feedback circuit to monitor at least one parameter of the system and to communicate the at least one parameter to the master communication interface via the second communication protocol.

3. The system of claim 1, wherein the first communication protocol enables communication of a packet having a plurality of segments, each segment including a plurality of bits having a first predetermined format.

4. The system of claim 1, wherein the first segment comprises a pulse width modulation (PWM) command to control switching of a bridge circuit of the device.

5. The system of claim 1, wherein the second communication protocol enables communication of a packet including a plurality of characters, each character including a plurality of bits having a second predetermined format.

6. The system of claim 2, wherein the at least one slave controller includes:
    a slave communication interface having a first port to interface with the link coupled to the master communication interface and a second port to interface with a link coupled to the device;
    a slave control circuit to receive the control information and to generate the first segment; and
    a slave feedback circuit to monitor at least one parameter of the system and to communicate the at least one parameter to the slave communication interface via the second communication protocol.

7. The system of claim 3, wherein the first predetermined format includes a start bit, a plurality of data bits, a parity bit, and a stop bit.

8. The system of claim 3, wherein the packet includes a first delimiter segment, at least one header segment, at least one command segment, a second delimiter segment and at least one checksum segment.

9. The system of claim 5, wherein the second predetermined format includes a start bit, an end of packet bit, a plurality of data bits, a parity bit, and a stop bit.

10. The system of claim 5, wherein the packet includes a header character, at least one command character, at least one data character, and a checksum character.

11. The system of claim 6, wherein the device includes an interface having:
    a receiver;
    a transmitter;
    a decoder to decode the first segment and the message; and
    a gate control circuit to receive the decoded first segment and to control a bridge circuit of the device responsive thereto.

12. A system comprising:
    at least one modular transformer having a primary winding coupled to an input power source and a plurality of secondary windings each coupled to a power cube;
    a first phase output line having at least a first power cube and a second power cube;
    a second phase output line having at least a first power cube and a second power cube;
    a third phase output line having at least a first power cube and a second power cube;
    a master controller to receive, via a second communication protocol from a cabinet controller coupled to the master controller, status information of the first and second power cubes of the phase output lines, generate control information based at least in part on the status information, and transmit the control information to the cabinet controller via the second communication protocol;

the cabinet controller coupled to the master controller via a first link of the second communication protocol, wherein the cabinet controller is to transmit the status information to the master controller and receive the control information from the master controller, and to generate and communicate a pulse width modulation (PWM) packet to the first power cube of the first phase output line via a first communication protocol based on a portion of the control information, wherein the cabinet controller is configured to interleave the PWM packet within a message having a plurality of segments of the first communication protocol communicated from the cabinet controller to the first power cube.

13. The system of claim 12, wherein the PWM packet is a single segment.

14. The system of claim 12, wherein the first phase output line has a third power cube, and wherein the first power cube is of the same or higher voltage potential relative to neutral than the second power cube, and the second power cube is of the same or higher voltage potential relative to neutral than the third power cube.

15. The system of claim 12, wherein the primary winding is phase shifted based on a phase shift of the plurality of secondary windings.

16. The system of claim 12, wherein the PWM packet is to control switching of a bridge circuit of the first power cube.

17. The system of claim 12, wherein the first communication protocol enables communication of a first packet format having a plurality of segments, each segment including a plurality of bits having a first predetermined format and the second communication protocol enables communication of a second packet format having a plurality of characters, each character including a plurality of bits having a second predetermined format, and wherein a number of the plurality of bits of the segments is less than a number of the plurality of bits of the characters.

18. The system of claim 12, wherein a segment of the first communication protocol includes the PWM packet to control a switching state of a bridge circuit of one of the power cubes, or a portion of a byte of a packet formed of a plurality of segments.

19. The system of claim 12, wherein the PWM packet is not included in a checksum calculation for the message.

20. The system of claim 12, wherein the first power cube is to echo the PWM packet back to the cabinet controller.

21. The system of claim 20, wherein the cabinet controller is to re-transmit the PWM packet to the first power cube if the echoed PWM packet does not match the PWM packet communicated by the cabinet controller.

* * * * *